(12) United States Patent
Wagenaar et al.

(10) Patent No.: US 9,936,229 B1
(45) Date of Patent: Apr. 3, 2018

(54) DELIVERY OF EDITED OR INSERTED MEDIA STREAMING CONTENT

(71) Applicant: CODESHOP BV, Amsterdam (NL)

(72) Inventors: Arjen Wagenaar, Amsterdam (NL); Dirk Griffioen, Amsterdam (NL); Rufael Mekuria, Amsterdam (NL)

(73) Assignee: CODESHOP BV, Amsterdam (NL)

( * ) Notice: Subject to any disclaimer, the term of this patent is extended or adjusted under 35 U.S.C. 154(b) by 0 days.

(21) Appl. No.: 15/598,360

(22) Filed: May 18, 2017

(51) Int. Cl.
*H04N 21/234* (2011.01)
*H04N 21/2187* (2011.01)
*H04N 21/231* (2011.01)
*H04N 21/2343* (2011.01)
*H04N 21/262* (2011.01)
*H04N 21/854* (2011.01)
*H04N 21/858* (2011.01)

(52) U.S. Cl.
CPC ... *H04N 21/23412* (2013.01); *H04N 21/2187* (2013.01); *H04N 21/23106* (2013.01); *H04N 21/23439* (2013.01); *H04N 21/26258* (2013.01); *H04N 21/854* (2013.01); *H04N 21/8586* (2013.01)

(58) Field of Classification Search
CPC ......... H04N 21/23412; H04N 21/2187; H04N 21/23106; H04N 21/23439
See application file for complete search history.

(56) References Cited

U.S. PATENT DOCUMENTS

| | | |
|---|---|---|
| 6,460,036 B1 | 10/2002 | Herz |
| 6,850,252 B1 | 2/2005 | Hoffberg |
| 7,751,584 B2 | 7/2010 | Zimmer |
| 7,786,444 B2 | 8/2010 | Wagenaar |

(Continued)

FOREIGN PATENT DOCUMENTS

EP  20140829855  7/2014

OTHER PUBLICATIONS

ISO/IEC JTC 1/SC 29, "Information technology—Coding of audio-visual objects—Part 12: ISO base media file format," ISO/IEC 14496-12:2012, 2016.

(Continued)

*Primary Examiner* — Sumaiya A Chowdhury
(74) *Attorney, Agent, or Firm* — Marc Boillot (57) ABSTRACT

A system and method for video presentation delivery with edited and/or inserted content based on adaptive bit-rate streaming is provided. It does not incur large additional storage costs or introduce playback vulnerability to inconsistent player implementations or ad blocking software. Embodiments include, requesting from a client to a server, a personalized or edited media presentation for delivery, sending there from a personalized or edited media presentation with a continuous timeline based on an adaptive bit-rate video streaming protocol such as MPEG DASH or HTTP Live Streaming (HLS), a video server module that converts data based on the MPEG-4 ISO Base Media File format to an adaptive bit-rate video streaming protocol presentation, a module for converting an XML based media presentation, such as in the synchronized media integration language (SMIL), to the MPEG-4 ISO Base Media File Format with a continuous timeline maintained by inserting additional audio samples.

17 Claims, 5 Drawing Sheets

(56) References Cited

U.S. PATENT DOCUMENTS

| | | |
|---|---|---|
| 8,108,895 B2 | 1/2012 | Anderson |
| 8,219,134 B2 | 7/2012 | Maharajh |
| 8,492,250 B2 | 7/2013 | Ko |
| 8,495,675 B1 | 7/2013 | Philpott et al. |
| 9,124,650 B2 | 9/2015 | Maharajh |
| 9,491,499 B2 | 11/2016 | Wagenaar et al. |
| 9,641,870 B1 | 5/2017 | Cormie et al. |
| 9,716,905 B2 * | 7/2017 | Edson ............... H04N 21/2381 |
| 2004/0258053 A1 | 12/2004 | Toporek |
| 2005/0165761 A1 | 7/2005 | Chan |
| 2005/0195975 A1 | 9/2005 | Kawakita |
| 2006/0029093 A1 | 2/2006 | Van Rossum |
| 2008/0195664 A1 | 8/2008 | Maharajh |
| 2010/0031339 A1 | 2/2010 | Minnen |
| 2010/0145777 A1 | 6/2010 | Ghosh |
| 2011/0225417 A1 | 9/2011 | Maharajh |
| 2012/0005313 A1 | 1/2012 | McGowan et al. |
| 2013/0007814 A1 | 1/2013 | Cherian et al. |
| 2014/0150019 A1 | 5/2014 | Ma |
| 2015/0026308 A1 | 1/2015 | MacTiernan |
| 2017/0094338 A1 * | 3/2017 | Kamekura ....... H04N 21/26258 |

OTHER PUBLICATIONS

IEC/ISO, "Information technology—High efficiency coding and media delivery in heterogeneous environments—Part 2: High efficiency video coding," ISO/IEC 23008-2:2015, 2015.
Nested Context Language. [Online]. http://www.ncl.org.br/.
ITU, "H.761 : Nested context language (NCL) and Ginga-NCL for IPTV services ," H.761, 2014.
W3C. Extensible Markup Language (XML). [Online]. http://www.w3.org/XML/.
ISO/IEC JCT1/SC29 MPEG, "ISO/IEC 23009-1:2014: Dynamic adaptive streaming over HTTP (DASH)—Part 1: Media presentation description and segment formats," 2014.
Apple. (Mar. 2016) HTTP Live Streaming. [Online]. https://developer.apple.com/streaming/.
IETF. RFC 2626 Hypertext Transfer Protocol—HTTP/1.1. [Online]. https://tools.ietf.org/html/rfc2616.
adblock plus. adblock plus. [Online]. https://adblockplus.org/.
Federal INformation Processing Standards, "Specification for the advanced encryption standard (AES)," NIST, 48051-48058, 2001.
Society of Cable and Telecommunication Engineers, "Digital Program Insertion Cueing Message for Cable ," 35, 2016.
W3C. (2008) Synchronized Multimedia Integration Language.
ISO/IEC JTC1 SC29 WG11, "Information technology—Coding of audio-visual objects—Part 10: Advanced Video Coding," ISO/IEC 14496-10:2014, 2014.
ISO/IEC JTC1 SC29 WG11, "Information technology—Generic coding of moving pictures and associated audio information: Systems," ISO/IEC 13818-1:2007, 2007.
Microsoft. Smooth Streaming Transport Protocol. [Online]. https://www.iis.net/learn/media/smooth-streaming/smooth-streaming-transport-protocol.
http://www.unified-streaming.com/blog/how-containers-make-unified-remix-easy-customize-and-quick-deploy This webpage is converted to a pdf and uploaded via EFS.

* cited by examiner

```
<?xml version="1.0" encoding="utf-8"?>
<smil xmlns:xsd="http://www.w3.org/2001/XMLSchema"
    xmlns:xsi="http://www.w3.org/2001/XMLSchema-instance"
    xmlns="http://www.w3.org/2001/SMIL20/Language">
 <head>
 </head>
 <body>
  <seq>
   <video src="http://myvid.com/ch/ads/pre-roll-ad.ism" />
   <video src="http://myvid.com/ch/content/news.ism" />
  </seq>
 </body>
</smil>
```

DELIVERY OF EDITED OR INSERTED MEDIA STREAMING CONTENT

FIELD

The present invention relates to Internet streaming of media, and in particular embodiments, adaptive bit-rate coding for video streaming with inserted or edited content using different Internet video streaming protocols.

BACKGROUND

Media services such as Internet video streaming are becoming increasingly popular. Typical Internet video streaming uses streaming protocols such as MPEG DASH or Apple® HLS that use the Hyper Text Transfer Protocol (HTTP) as the primary transport protocol. A popular way to monetize on Internet video streaming of content is by inserting content such as advertisements or other personalized content. Contrary to traditional broadcasting, advertisements can be fully personalized as contrary to TV broadcasting, each user receives data through their own Internet connection. This makes insertion of content in Internet video presentations for advertisement attractive and a large potential source of revenue.

The Internet is a global platform for delivery but sometimes media presentations need to be edited to conform to geo-local preferences such as local legislation, cultural habits, language and so on. For example, some explicit language or violent scenes may need to be removed to conform to some geo local preferences. On the other hand, short scenes that present certain information such as explicit content warnings may need be added or other supplementary information such as author credentials. These needs make Internet video streaming with edited or personalized content highly desirable as it can serve the differentiated needs.

Approaches for Internet video streaming with edited or inserted content have been developed based on manipulation of the streaming manifest. The manifest file in an Internet streaming video presentation such as the .mpd file in MPEG-DASH or the .m3u8 file in Apple® HLS include links to individually downloadable pieces of media content called segments. By pointing these URL's towards both segments of original and edited content at different locations, personalized streaming presentations with edited or inserted media can be created.

A large disadvantage of the manifest manipulation approach is that it raises vulnerability to ad blocking software that is increasingly used. Ad Blocking software such as AdBlock plus often runs on clients and contains ways to block requests to specific blacklisted hosts related to advertisements. Ad blocking software is becoming increasingly popular, and will often break approaches based on manifest manipulation. This is because the software can read into the manifest to block outgoing requests, or to block outgoing HTTP requests based on the host name and or certain key words in the URL string.

Another drawback of manifest manipulation is that many players and sources use a digital rights management solutions (DRM) that involves, at some stage, encrypting the media content in the segments using an encryption standard such as based on the Advanced Encryption Standard (AES). As different encryption schemes are often used by different contents, clients may fetch content from different sources with different encryption techniques. When different DRM solutions or encryption methods are used, many players will have a problem to decrypt and playback the edited presentation based on manifest manipulations. This is because simultaneous usage of different digital rights management solutions and different encryption techniques in a single presentation is often not supported by players used by the client.

Alternatively, presentations could be prepared at the server side for delivery as a single presentation. This would result in explosive storage needs and costs due to the fact that each of the versions for each specific configuration need to be stored separately. This makes this approach economically unattractive due to the storage costs. Instead, a method for online editing or insertion of streaming media content for adaptive bit-rate video that does not incur exploding storage costs is desirable. However this is highly challenging for modern Internet media streaming, as multiple protocols, different bit-rates and different schemes for DRM need to be supported, and synchronized playback without interruption is needed. Such a solution would require significant advances beyond the state of the art to be realized without exploding storage costs, susceptibility to ad blocking technology or other drawbacks in present day solutions.

The society of cable telecommunication engineers has defined the standard SCTE 35 that enables signaling of splice points in a compressed video stream. These splice points defined in SCTE 35 constitute markers where a splicing device can switch the content in the video stream and insert alternative content. SCTE 35 splice points can be used to insert or switch content at the right point in the video stream. SCTE 35 was designed to work with the MPEG-2 Transport stream format, but can also be signaled in the MPEG-DASH based on fragmented MPEG-4. Signaling SCTE 35 in MPEG DASH still changes the manifest file, for example signaling a DASH event in an MPEG DASH file, and possibly makes use of URL's point to different sources in this manifest. This can be picked up by ad blocking software as to hint or detect advertisement content making this approach still potentially vulnerable to ad blocking technologies. Further, while the SCTE 35 marker can indicate a time point in the stream where a switch can be made, it does not teach how video content should be inserted for online video streaming presentations that reduces storage costs.

SUMMARY

The novel solutions herein contemplated are disclosed in various embodiments. In one embodiment, a novel system targets the streaming of video presentations with edited or inserted media content in the Internet between a client and a server. The method enables sending personalized or edited media content using common video streaming protocols to be received and played by most media players and clients without introducing vulnerability to ad blocking software and player variations. In some deployments and embodiments the system can be used to insert advertisement content in real time in Internet streaming presentations. In some other embodiments the system adds information to video streaming presentations such as author credentials or localized information. In an exemplified embodiment, an HLS or MPEG DASH client connects through a proxy or CDN to a video origin based on the Unified Origin that retrieves a remixed mpeg-4 data that is based on the MPEG-4 ISO Base Media File Format (BMFF) container format with a continuous timeline generated by a remix module. In this embodiment the remix module can use a textual XML based play list such as based on the Synchronized Media Integration Language to generate a file with data in the ISO Base media file format with a continuous time line by inserting audio samples to stitch two playlists.

BRIEF DESCRIPTION OF THE DRAWINGS

For a more complete understanding of this disclosure, reference is now made to the following brief description, taken in connection with the accompanying drawings and detailed description, wherein like reference numerals represent like parts. The presented figures illustrate one or more embodiments.

SPECIFICATION

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Media streaming in the Internet often uses video content coded at different bit-rates and delivered using different streaming protocols such as MPEG DASH or Apple® HLS that enable a streaming a media presentation. In addition, segmentation of media presentations is not always aligned and presentations may use a different timeline. Herein, we call media without playback gaps or interruptions and continuously incrementing playback timestamps a media presentation with a continuous timeline.

Altogether, the nature of the clients and the lack of control over their implementations makes the editing and insertion of content in media streaming presentations a difficult problem. Naïve approaches for streaming of inserted or edited content typically involve manifest manipulation. Such approaches make the video streaming presentation susceptible to ad blocking software. Alternatively, one could perform the editing at the server side and generate edited presentations, possibly with content inserted separately. This would enable presentations with edited or inserted content but incurs large computational and storage costs as each presentation needs to be prepared and the media content needs to be stored separately as timelines will be different. As video streaming often uses adaptive bit-rate, each of the bit-rate encodings also need to be stored separately. All together this results in explosive storage requirements proportional to the number of different edits or inserted content types times the size of the original media presentation.

Figure 1:
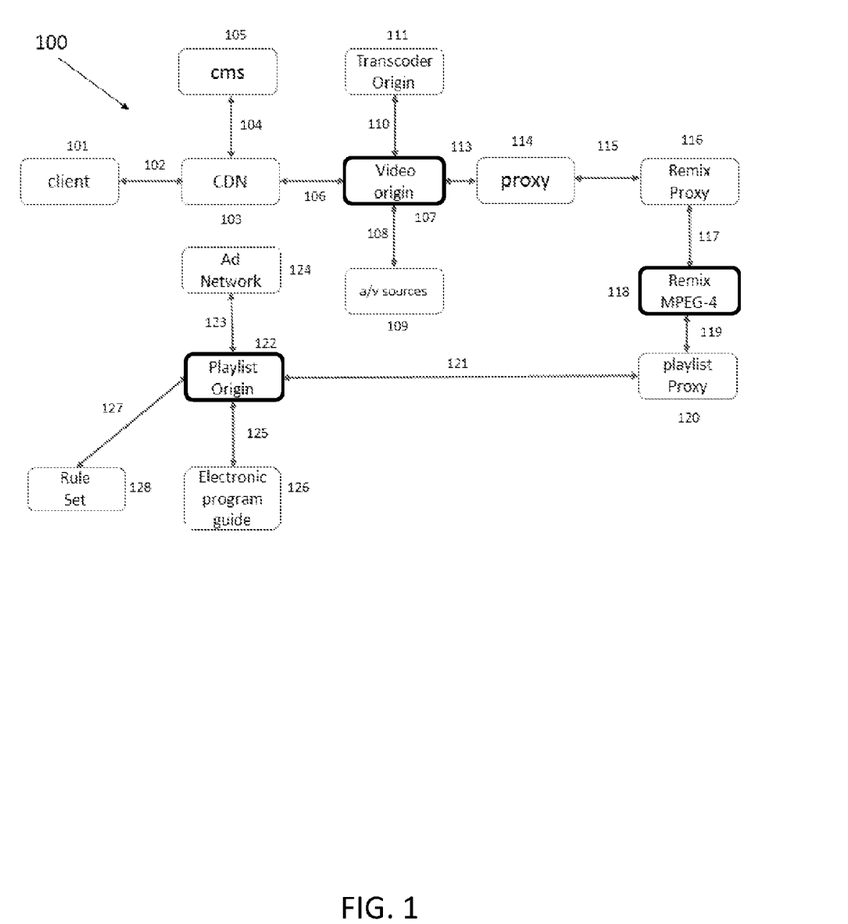
FIG. 1 illustrates a media streaming system with both server and client side components for streaming media with inserted and edited content in accordance with one embodiment.

FIG. 1 illustrates an embodiment of a streaming system 100 for delivering, to a client 101, media presentations with edited or inserted content. The system 100 includes, at the least, a playlist origin 122, a remix MPEG-4 module 118, and a video origin server 107. The playlist origin 122 is configured to generate a XML based media playlist, for example, one in the synchronized media integration language SMIL. The remix MPEG-4 module 118 is configured to generate a MPEG-4 ISO Base Media File Format data from the XML based media playlist. The Remix MPEG-4 Module 118 is linked to the playlist origin 122 to receive the XML based media playlist from the playlist origin 122. In another arrangement, the MPEG-4 Remix Module can receive the XML based media playlist, through a playlist proxy 120, and convert it to the playlist to MPEG-4 ISO Base Media File Format data.

The video origin server 107 is linked to the remix MPEG-4 module 118 to receive the MPEG-4 ISO Base Media File Format data. It is configured to generate a media presentation for different streaming protocols from the MPEG-4 ISO Base Media File Format data. The video origin server 107 converts the ISO base media format file to a media presentation for adaptive bit-rate streaming over HTTP, such as MPEG-DASH or Apple® HLS that is ultimately presented to the client 101. The video origin server 107 generates the media presentation including both the packaged media data and the streaming manifest. In addition, the video origin server 107 can optionally add content protection based on a Digital Rights Management solution (DRM) protecting the media presentation that is finally delivered to the client. In such capacity, the video origin server 107 can exist as a service or software program running on a physical or virtual server, designed to serve many users for content based on the HTTP protocol. The video origin server 107 serves client requests based on one or more of the following video streaming protocols: Apple® HLS, MPEG-DASH, Microsoft Smooth or progressive download. The video streaming origin server 107 takes as input media content 113 based on the MPEG-4 ISO Base Media File Format data or other media formats such as MPEG-2 TS, possibly received through the proxy 114.

In some embodiments the video origin server 107 can also communicate to the transcoder origin 111 making a request through a format 110 to transcode a media segment of the media presentation. The transcoder origin can then convert the bit-rate of a segment of media data to a different bit-rate. These transcoded segments 110 can then be used to complete the media presentation 106 for delivery to the client 10. This is helpful to make sure that segments are in the correct format for delivery 102 to the client 101. For example, segments with bit-rates not available in the media sources could be generated when needed for the adaptive bit-rate media presentation.

In a preferred embodiment, the video origin server 107 is based on a Unified Origin provided by the Unified Streaming Platform. By such design, the system 100 leverages an architecture that results in low storage costs and produces a media presentation with a continuous timeline that is extremely resilient to any ad blocking software or implementation variations of the client 101. This architecture permits the system 100 to deliver media presentations with edited or inserted content to a client 101 without increasing storage requirements or increasing vulnerability to ad blocking software.

Practical implementations of modules 107, 109, 111, 114, 116, 118, 120, 122, 124, 126, as discussed ahead, can all be based on server software programs or services running on physical or virtual servers on the same or different computers. The exchange of information (i.e., 106, 108, 110,113, 115,117, 119,121, 123, 125, 127), as discussed ahead, between these servers can occur through a network or a local interface such as a CPU bus, or a shared memory and uses different underlying transport protocols such as the Hyper Text Transfer Protocol in some embodiments. In addition these modules can run on physical or virtual servers, not precluding containerized instances such as based on technologies like Docker or Linux Containers.

Figure 2:
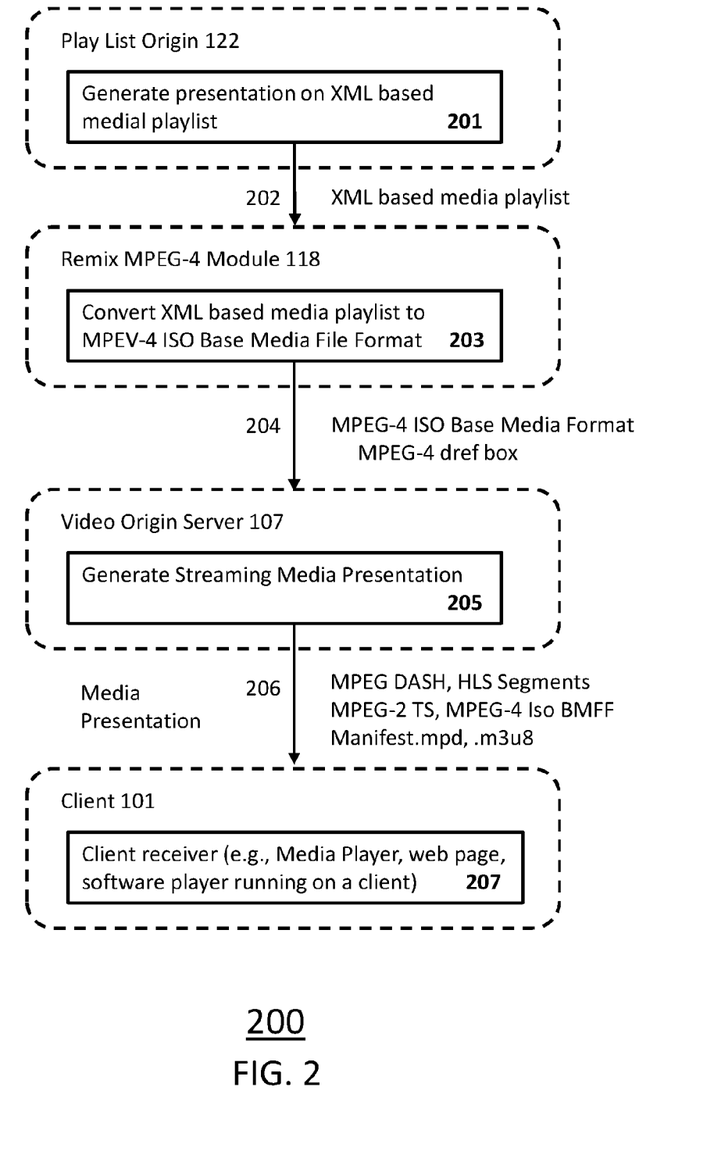
FIG. 2 illustrates a method for server side content editing and insertion comprising the textual playlist generator, the MPEG-4 remix ISO base media file format generator, the video origin streaming server and an exemplary player on the client side in accordance with one embodiment.

FIG. 2. Illustrates steps of an exemplary method 200 for streaming inserted or edited content. Reference will be made to FIGS. 1, 3, 4 and 5 when describing components that practice the method steps shown. The method 200 may also be practiced by the modules described, but is not limited to only those modules. And, the method 200 may include more or less than the number of steps shown.

Figure 5:
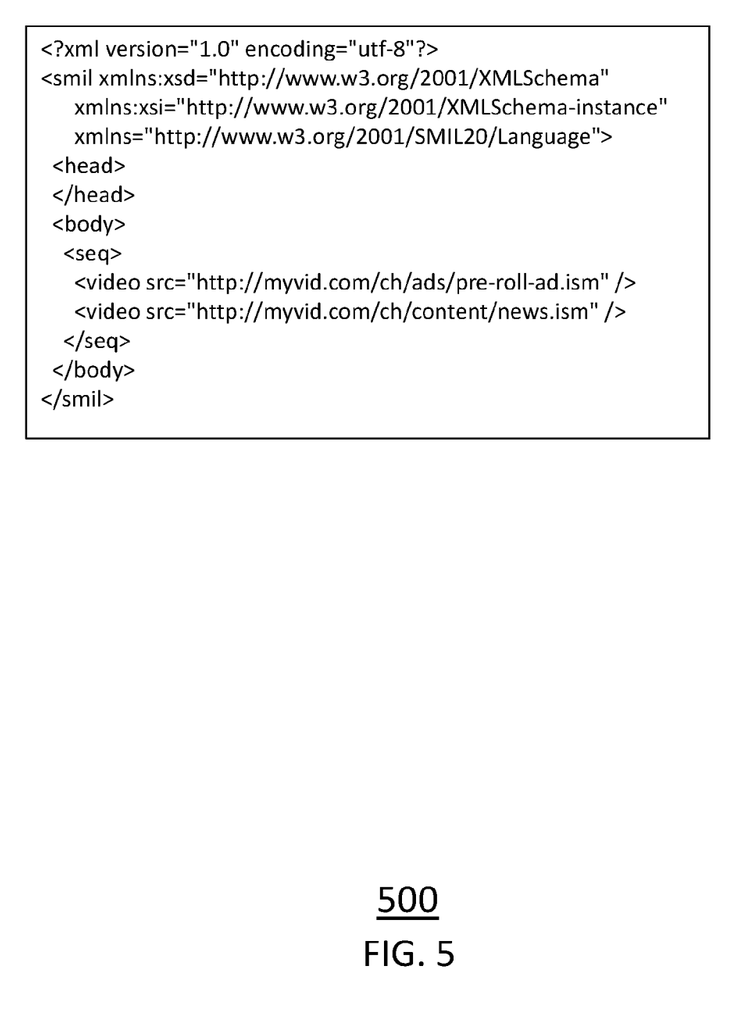
FIG. 5 illustrates a SMIL file generated by the playlist Origin for an exemplary use case the pre roll of a content segment before the main content in accordance with one embodiment.

The method 200 can begin at step 201, in which the playlist origin 122 generates XML based media playlist 202 for different streaming protocols by way of the video origin server 107. The generated playlists are in an XML based media playlist including but not limited to Synchronized Multimedia Integration Language (SMIL) to describe the media presentation. Briefly, FIG. 5 presents an example use case of a SMIL file 500 representing the XML based media playlist 202. The SMIL file references both the inserted and original content that will be streamed together in a video streaming presentation. The possibilities of different configurations offered by SMIL enables different SMIL Origins to be designed for different use cases. An example of a SMIL origin is a fixed pre-roll (a fragment of video before the original video content, or a mid-roll, a fragment of video in the middle of the content). These scenarios can be modeled in the SMIL language or alternative declarative languages.

Referring now to FIG. 1, in view of method step 201, at this time, the playlist origin 122 can generate the one or more XML based media playlists 202 that the remix MPEG-4 module 118 then converts to the MPEG-4 ISO Base Media File Format data based on an electronic program guide 126 by way of rules in the rule set 128. The playlist origin 122 extracts the information made available in an electronic program guide 126 or extracting information made available from a rule set 128 prior to the step of converting, and composes references to programs in external sources and content in the XML based media playlist including one or more seq tags in the XML based media playlist.

Other XML based languages for media composition such as Nested Context Language (NCL), developed as a declarative language for interactive television and web based multimedia presentations, can also be used. The XML based media playlist can be retrieved 119 through a playlist proxy 120 that could be an HTTP cache. The playlist proxy 120 can be used to cache the playlist based on SMIL in a preferred embodiment, in other embodiments other text formats such as NCL or other Text formats could be used instead. The playlist proxy 120 can request the original playlist from the Playlist Origin 122 through a request 121. The Playlist Origin 122 generates the playlists based on a programmed implementation, for example using a Hypertext preprocessor script (PHP) or PERL script, or from another server side scripting or programming language. The Playlist Origin 122 is a SMIL Origin when it generates the playlists in SMIL or alternatively 122 could generate playlists in the Nested Composition Language NCL or other XML based playlists for presenting an edited media presentation with inserted content.

The playlists can also be based on Rule Set 128 to implement specific edited use cases, content presented in Electronic Program Guide (EPG) 126 that provides timings of program offerings or an ad network 124. The rule sets could be simple rules for inserting like "a bumper video for everyone depending on the day", or inserted content in the middle of a video presentation. Alternatively, typical content provided for advertisements could be retrieved from the ad network 124. An ad network is typically a broker that negotiates advertisement content between publishers and commercial advertisement content. The ad network is therefore a key source of inserted content. The (EPG) 126 is an online available guide that represents the exact timelines of video and media content. Their information can be used to infer the best positions and how to seamlessly insert content and switch back to the original media presentation.

Returning back to method 200 of FIG. 2, at step 203, the remix MPEG-4 module 118 converts the XML based media playlist 202 to data in the MPEG-4 ISO Base Media File Format (BMFF) 204 with a continuous timeline. That is, the remix MPEG-4 module generates the MPEG-4 ISO Base Media File Format data with a continuous timeline based on the XML based media playlist. It can generate MPEG-4 ISO Base Media File Format data 204 from a textual playlist based on the XML based media playlist 202. During this step, the remix MPEG-4 module 118 also inserts compressed silent audio samples in the MPEG-4 ISO Base Media File Format data 204 to preserve the continuous timeline of the XML based media playlist 202 received from the playlist origin 122. The MPEG-4 ISO Base media data 204 can then be requested by the server side video origin server 107 at step 205 to generate different media presentations 206.

Next, the video origin 107 retrieves the ISO Base Media File Format 204, which contains a minf box 403 and a dref box 405 that each point to a location of a one or more audio and video sources used by the video origin 107 for creating the media presentation based on a video streaming protocol from the ISO Base Media File Format data. Briefly, FIG. 4. is a depiction 400 illustrating an internal structure 204 of the MPEG-4 ISO Base Media File Format data (see same 204 in FIG. 2) comprising the boxes in the containers moov box 401, encapsulating the mdia box 402, the minf box 403, the dinf box 404, and the dref box 405. The minf box 403 is a container box in the MPEG-4 ISO Base Media File Format data that contains the dref box 405 and is a container box in the MPEG-4 ISO Base Media File Format data 204 containing information about the location of the one or more audio and video sources 109 (same from FIG. 1). The one or more audio and video sources are located in a different location other than the MPEG-4 ISO Based Media File Format data.

Figure 4:
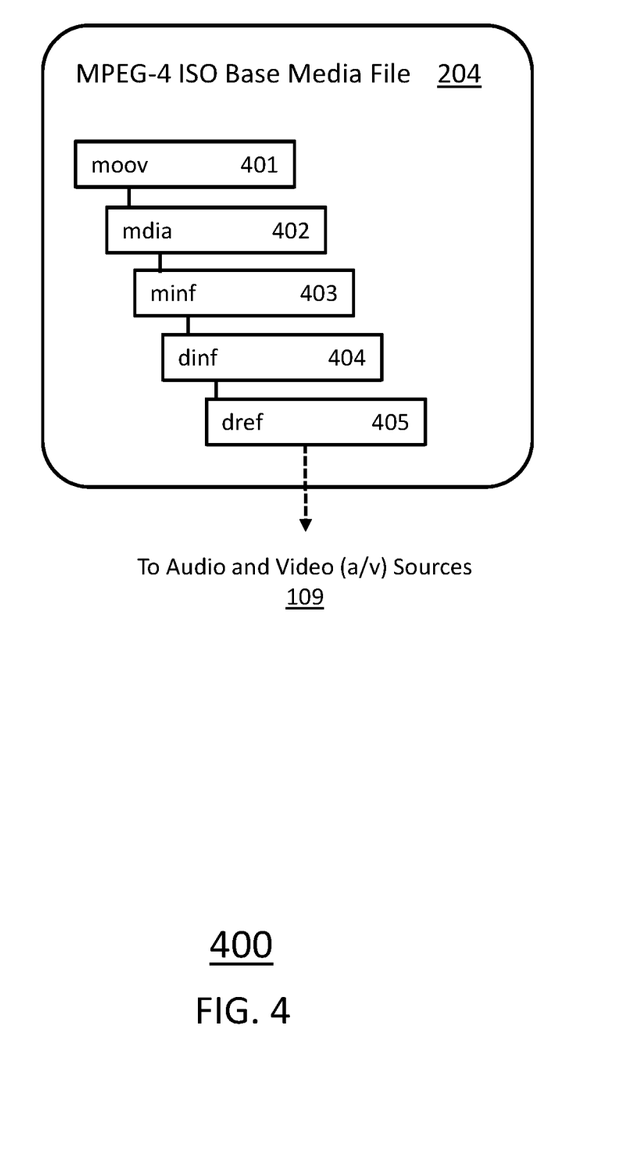
FIG. 4 illustrates a MPEG-4 ISO Base Media File Format (BMFF) data generated by the Remix MPEG-4 module illustrating the box encapsulation and the link to the external media sources.

Another embodiment of the disclosed input format shown in FIG. 4 uses the dynamic reference content atom (dref) 405 in the ISO base media file format 204, signaled in the dref atom 405 that is located in the minf box 404 in the ISO base media file format. The dref atom references audio and video sources 109 that can retrieved, for example through an HTTP GET requests 108 (see FIG. 1) or any other network protocol. The media sources could be media information conveyed in different formats such as the ISO Base Media Format, or raw encoded formats of MPEG-4 AVC/H.264 or HEVC, audio based on the Advanced Audio Coding format (AAC) or other digital compressed media formats. In a preferred embodiment the MPEG-4 ISO base media format data uses dynamically referenced media sample content signaled in the dref box 405. The media sources can be located at any location in the network, such as in the ad network 124 that serves advertisements to publishers, the video streaming origin or any other location such as a network attached storage or a cloud based object storage.

Briefly referring again to FIG. 1, in view of FIG. 4 and method step 203 of FIG. 2, the video origin server 107 receives the input in the ISO Base Media file format, optionally through the proxy 114. The proxy 114 can be an HTTP cache and can be used to cache the ISO Base Media File Format data 204 that in a preferred embodiment contains the dref box 405 in the minf box 403 to refer to the media sources located in the a/v sources 109. The proxy 114 can request this data in the ISO Base Media File Format data 204 from Remix MPEG-4 module 118 through the interface 117. The MPEG-4 Remix Module 118 is then used to convert an input based on the XML based media playlist 202 such as in some embodiments in the Synchronized Media Integration Language (SMIL) to the said ISO Base Media File Format data 204. A preferred complete embodiment of this invention is based on Unified Remix, developed by the Unified Streaming Platform. However, any other software or hardware module can be used that can convert an XML based media playlist 202 to MPEG-4 ISO Base Media file format data 204 with a continuous timeline.

Returning back to method 200 of FIG. 2, in describing step 205, the video origin server 107 generates a streaming media presentation 206. The media presentation 206 consists of a streaming manifest, such as the .mpd file for MPEG DASH that contains information about the edited/inserted media presentation, or the .m3u8 for Apple® HLS, and a plurality of segments that contain the media information. It includes a plurality of segment data and a manifest file, for instance, that comply with typical Internet video streaming protocols such as MPEG DASH or Apple® HLS that use the Hyper Text Transfer Protocol (HTTP) as the primary transport protocol. Recall, the remix MPEG-4 module 118 is linked to the playlist origin 122 to receive the XML based media playlist 202.

Returning back to method 200 of FIG. 2, at step 207, the client 101 retrieves the media presentation it requested and learns about the media presentation by consuming the streaming manifest. This allows it to thereafter request a single or plurality of media segments from the video origin server for playback. This permits the client 101 to requests from the content management system (CMS) 105 a personalized URL for usage to request a personalized manifest for the media presentation with inserted or edited content from the video origin server. This step of receiving data formatted in the MPEG-4 ISO Base Media File Format data can occur by way of, or through, a proxying, for example, proxying via one or more interconnected proxies 114. Recall, the remix MPEG-4 module is linked to the playlist origin to receive data formatted in the XML based media playlist by way of, or through, the playlist proxy.

The delivery 102 to the client 101 may occur through a content delivery network cache (CDN) 103 that can be based on an HTTP proxy cache such as based on Nginx or Varnish. In one arrangement, the CDN 103 comprises one or more intermediate cache (see CDN/Cache 104) or configuration proxies, where the client 101 is linked to the video origin server 107 to receive data formatted in the media presentation through the CDN. The media presentation can be based on MPEG DASH, MPEG-2 TS, Apple® HLS, Microsoft Smooth Streaming or any other type of streaming protocol supported by the client 101. The client 101 may be a program or application implemented in an operating system of a user device, or it may be a web client accessed in a web platform. The client 101 may be implemented in any user device, such as a mobile phone, notebook, computer, television, etc. If MPEG DASH is used, the client 101 is called a DASH client. If Apple® HLS is used, the streaming client 101 is called an HLS client. The Content Management Systems (CMS) 105 tracks user requests and content. The content management can be a server or service running on a physical or virtual server in the network. The CMS 105 communicates with the CDN 103 to exchange request and content information or directly to the client/player 101.

Figure 3:
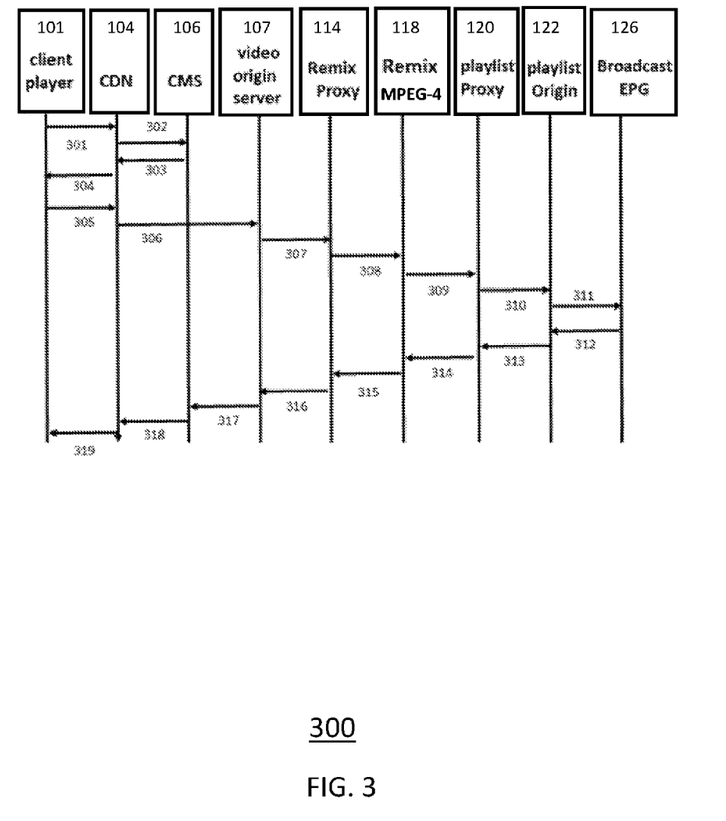
FIG. 3 illustrates a sequence diagram of a client requesting and retrieving streaming media content in accordance with one embodiment.

FIG. 3. Illustrates a sequence diagram 300 of a client 101 requesting from a server a personalized or edited/inserted media presentation in an exemplified embodiment. This sequence diagram also helps to illustrate how the various modules shown in FIG. 1 practice the method 200 steps of FIG. 2. It should also be noted that the method steps shown can be practiced with more or less than the number of components shown and are not necessarily restricted to the order shown. The sequence can also include more or less than the number of steps shown in practice.

The sequence diagram 300 can start with the client 101, for example, where the user name Mary is logged in and wants to watch the item 'news' which she requests at step 301, possibly through a CDN 103 or cache 104, to the Content Management System (CMS) 105 via the request at step 302. The CMS 105 creates a personalized URL base64 (news?user=mary).mp4 (containing 'mary' as identifier to be used later on) and returns it to the user at step 303, or optionally, through the CDN 103 or cache proxy 104, via step 304, that is based on Nginx or Varnish in some embodiments. The base64( ) operation refers to a base64 encoding that converts binary data to numeric (e.g. base 10 or character) values on a 64 base.

Upon completion of step 304, the user is now ready to watch the presentation. At step 305, the client player 101 requests the media presentation 106 (based on the streaming manifest) base64(news?user=mary).mp4/.mpd 312, or optionally through the CDN 103 or cache 104 to the video origin server 107 via step 306. On the other hand if Mary would like to request a streaming manifest for an Apple® HTTP Live Streaming (HLS) presentation in a similar way the client 101 would request the manifest by base64 (news?user=mary).mp4/.m3u8 from the video origin server 107. The video origin server 107 receives the request for base64(news?user=mary).mp4/.mpd and requests base64 (news?user=mary).mp4 to Remix Proxy 114 by an HTTP get request 307. The Remix Proxy 116 receives the GET base64 (news?user=mary}.mp4 and forwards the request at step 308 to Remix MPEG-4 Module 118. The Remix MPEG-4 Module 118 issues a request for base64(news?user=mary).smil, as an HTTP GET Request at step 309, to the playlist Proxy 120. The playlist proxy 120 receives the request for base64 (news?user=Mary).smil and forwards the request to playlist Origin 122 at step 310.

The Playlist Origin 122 generates the new playlist (using the base64 decoded information), while at step 311, optionally requesting information from the broadcast EPG 126 which it retrieves at step 312. The Playlist Origin 122 then returns this information to the Playlist Proxy 120 at step 313. Playlist Proxy 120 stores the generated playlist in its cache for future requests and returns a copy to the Remix MPEG-4

Module 118 via step 314. Remix MPEG-4 Module 118 creates a remixed mp4 with a continuous timeline, 315, and returns the MP4 file to the video origin 107 at step 316 via a remix proxy 114, in a preferred embodiment in the response body, to the Remix Proxy. Remix Proxy 114 caches the response as base64(news?user=mary).mp4 and returns a copy to the Unified Origin. In a preferred embodiment the base64(news?user=mary).mp4 is based on the ISO Base media file format data that uses the dref box located in the minf container to signal the location of the media information. Based on the returned data from the Remix Proxy the origin 107 creates the media presentation (including the streaming manifest) and returns it directly, or via the CMS through step 317 and/or possibly through the CDN or cache layer 104 at step 318 to the client 101 at step 319.

In the above-description of various embodiments of the present disclosure, aspects of the present disclosure may be illustrated and described herein in any of a number of patentable classes or contexts including any new and useful process, machine, manufacture, or composition of matter, or any new and useful improvement thereof. Accordingly, aspects of the present disclosure may be implemented in entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product comprising one or more computer readable media having computer readable program code embodied thereon.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, C++, C#, VB.NET, Python, Vala, GEM, or the like, conventional procedural programming languages, such as the "C" programming language, Visual Basic, Fortran 2003, Perl, PHP, dynamic programming languages such as Python and Ruby or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS) and Security as a Service (SECaas).

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

It is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items Like reference numbers signify like elements throughout the description of the figures.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A system for streaming a media presentation with inserted or edited media content from a server to a client through a network, the system comprising:
 a video origin server configured to generate a media presentation for different streaming protocols;
 a remix MPEG-4 module configured to generate a MPEG-4 ISO Base Media File Format data from a XML based media playlist; and
 a playlist origin, configured to generate the XML based media playlist,
 where the video origin server is linked to the remix MPEG-4 module to receive the MPEG-4 ISO Base Media File Format data from the remix MPEG-4 module, and,
 where the Remix MPEG-4 Module is linked to the playlist origin as the remix MPEG-4 module receives the XML based media playlist from the playlist origin,
 where the video origin retrieves the ISO Base Media File Format that contains a minf box and a dref box minf that each point to a location of a one or more audio and video sources used by the video origin to create the streaming media presentation, and
 where the playlist origin generates one or more XML based media playlists that the remix MPEG-4 module then converts to the MPEG-4 ISO Base Media File Format data based on an electronic program guide or by way of rules in a ruleset.

2. The system of claim 1, further comprising of a CDN comprising one or more intermediate cache or configuration proxies, where the client is linked to the video origin server to receive data formatted in the media presentation through the CDN comprising one or more intermediate cache or configuration proxies.

3. The system of claim 1, further comprising a proxy, where the video origin server is linked to the remix MPEG-4 module to receive data formatted in the MPEG-4 ISO Base Media File Format data by way of, or through, the proxy.

4. The system of claim 1, further comprising a playlist proxy where the remix MPEG-4 module is linked to the playlist origin to receive data formatted in the XML based media playlist by way of, or through, the playlist proxy.

5. The system in 1, where the client requests from a content management system (CMS) a personalized URL for usage to request a personalized manifest for the media presentation with inserted or edited content from the video origin server.

6. The system in 1, where the remix MPEG-4 module generates the MPEG-4 ISO Base Media File Format data with a continuous timeline based on the XML based media playlist.

7. The system in 1, where the remix MPEG-4 module inserts compressed silent audio samples in a MPEG-4 ISO Base Media File Format data to preserve the continuous timeline of the XML based media playlist received from the playlist origin.

8. The system of claim 1, where the minf box is a container box in the MPEG-4 ISO Base Media File Format data that contains the dref box that is a container box in the MPEG-4 ISO Base Media File Format data that contains information about the location of the one or more audio and video sources.

9. The system in 8, where the one or more audio and video sources are located in a different location other than the MPEG-4 ISO Based Media File Format data.

10. A method for streaming a media presentation with inserted or edited content between a server and a client through a network, the method comprising the steps of:
 generating a media presentation for different streaming protocols by way of a video origin server,
 generating MPEG-4 ISO Base Media File Format data from a textual playlist based on an XML based file format by way of a remix MPEG-4 module,
 providing or generating playlists in an XML based media playlist including but not limited to Synchronized Multimedia Integration Language (SMIL), that describes the media presentation by way of a playlist origin implemented in hardware or software,
 receiving the MPEG-4 ISO Base Media File Format data from the remix MPEG-4 module by way of the video origin server, where the remix MPEG-4 module is linked to the playlist origin as the remix MPEG-4 module receives the XML based media playlist from the playlist origin;

retrieving the MPEG-4 ISO Base Media File Format that contains a minf box and a dref box minf that each point to a location of a one or more audio and video sources used by the video origin to stream the media presentation, and generating one or more XML based media playlists that the remix MPEG-4 module then converts to the MPEG-4 ISO Base Media File Format data based on an electronic program guide or by way of rules in a ruleset.

11. The method of claim 10, further comprising the step of receiving data formatted in the MPEG-4 ISO Base Media File Format data by way of, or through proxying.

12. The method in 10, further comprising:
requesting from the content management system a personalized URL for usage by a client; and
requesting a manifest for the media presentation with inserted or edited content from the video origin server.

13. The method of claim 10, where the step of generating the MPEG-4 ISO Base Media File Format data from the XML based media playlist by way of a remix MPEG-4 module further performs the steps of:

retrieving the XML based media playlist from the playlist origin; and
generating the ISO Base Media File Format data with a continuous timeline from the XML based media playlist.

14. The method of claim 13, further comprising inserting compressed silent audio samples in the ISO Base Media File Format data to preserve the continuous timeline of the XML based media playlist.

15. The method of claim 14, further comprising:
generating the XML based media playlist for usage by the remix MPEG-4 module; and
converting the XML based media playlist into data formatted in an ISO base media file format.

16. The method of claim 15, further comprising:
composing references to programs in external sources and content in the XML based media playlist including one or more seq tags in the XML based media playlist.

17. The method of claim 13, where the step of retrieving the XML based playlist occurs by way of a proxying via one or more interconnected cache or configuration proxies.

* * * * *